United States Statutory Invention Registration [19]

[11] Reg. Number: H780

Hartman [43] Published: May 1, 1990

[54] OPTICAL DATA PROCESSING DETECTION OF CHEMICAL AGENTS

[75] Inventor: Richard L. Hartman, Huntsville, Ala.

[73] Assignee: The United States of America as represented by the Secretary of the Army, Washington, D.C.

[21] Appl. No.: 227,570

[22] Filed: Aug. 3, 1988

[51] Int. Cl.[5] ..... G01J 3/457

[52] U.S. Cl. ..... 356/71; 356/303; 356/326; 382/1

*Primary Examiner*—Matthew A. Thexton
*Assistant Examiner*—Daniel S. Metzmaier
*Attorney, Agent, or Firm*—Freddie M. Bush; James T. Deaton

[57] ABSTRACT

A method of detecting chemical agents present in a sample by utilizing a spectrometer to produce an output spectrum which is transmitted to an optical correlator which processes the output spectra of the spectrometer and identifies particular chemical species present in the sample by utilizing a detector and indicator arrangement.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL DATA PROCESSING DETECTION OF CHEMICAL AGENTS

DEDICATORY CLAUSE

The invention described herein may be manufactured, used, or licensed by or for the Government for governmental purposes without the payment to me of any royalties thereon.

BACKGROUND OF THE INVENTION

In the past, the most common way for detecting chemical agents and pollutants has been the wet chemistry method. In the laboratory, spectrometers which measure the optical spectrum have been used to provide sensitive and positive identification of compounds. Until recently, identification of the compounds has been done by a skilled worker comparing the spectra produced to a reference spectra. In the real world, this problem is complicated by the presence by many intermingled spectra. More recently, digital computers have proven useful in making some identifications and comparison of the spectra and thereby enabling the determination of what species are present in a sample. Therefore, it can be seen that there is a need for a way to more accurately and positively identify chemical compounds other than by the ways that have been accomplished in the past.

Accordingly, it is an object of this invention to provide a method by which the light spectra from a spectrometer can be used in a correlator that has a Fourier Transform matched filter therein to positively identify if a particular spectra of a chemical compound is present.

Another object of this invention is to provide a method which utilizes the benefits of a spectrometer with a simple compact correlator as is available today to detect the presence of specific chemical species.

Still another object of this invention is to provide a means for detecting the presence of a specific chemical compound even though the spectra of the compound produced by the spectrometer may not be a recognizable spectra if inspected by a human.

Still a further object of this invention is to provide a method by which the correlator used will tolerate poor calibration of the spectrometer.

Other objects and advantages of this invention will be obvious to those skilled in this art.

SUMMARY OF THE INVENTION

In accordance with this invention, a method is provided for detection of selected chemical agents when present in a sample by utilizing a spectrometer to produce an output spectra of the detected chemical compound and transmitting this optical spectra to an optical correlator which processes the image spectra from the spectrometer and compares the image with that on a matched filter and if they are the same an output is produced onto a detector which then is used to indicate that the species is present.

DESCRIPTION OF THE PREFERRED EMBODIMENT

Figure 1:
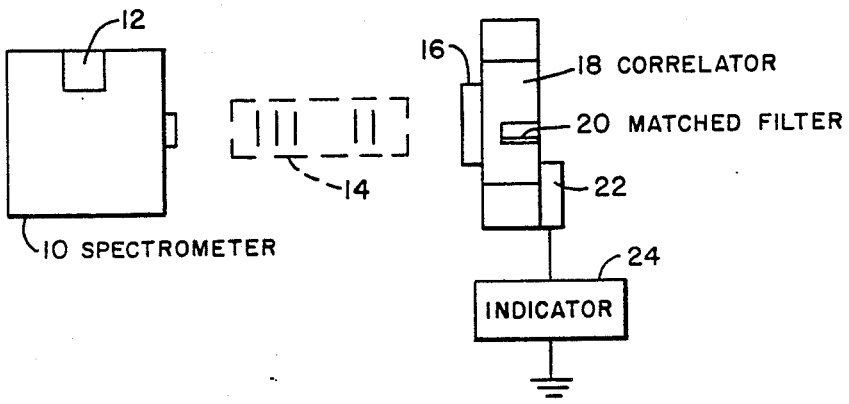
FIG. 1 is a diagrammatic view illustrating the structure used in carrying out the method of this invention.

Spectrometers of many types are known and used as standard equipment. These include those that operate to produce an output in the ultraviolet, visible, and infrared. A conventional spectrometer can be utilized with this invention to carry out the method thereof.

An optical correlator is a device which recognizes image patterns. Optical correlators of the laboratory equipment type are expensive and complicated, but recently a solid block correlator has been produced and has the capability of making optical correlators rather inexpensive and of a structure that can be fielded in various locations and transportable. These devices have the ability of taking light spectra and analyzing it and comparing it with a matched filter to determine if the light spectra and the matched filter are the same to cause a correlation to occur and an output to be produced that can initiate a detector. This invention is directed to a method which utilizes the output from a spectrometer as an input to an optical correlator for determining if the output spectra of the spectrometer contains light spectra that corresponds to that of a predetermined matched filter that contains the image of the species desired to be detected.

Referring now to the drawings, the method according to this system is carried out by utilizing a spectrometer 10 that has a chemical compound sample 12 therein that is desired to be tested to determine if it has a particular ingredient therein and an output such as that illustrated at 14 is produced by spectrometer 10 and transmitting to image formulating modulator 16 of block type correlator 18 which utilizes a laser diode as the light source and has a matched filter 20 with the appropriate predetermined pattern thereon for identifying the desired predetermined species. If light spectra 14 matches that desired to be detected, an output from matched filter 20 will be produced and projected onto detector 22 which will cause indicator 24 to indicate that the species is present. Indicator 24 can be a light, buzzer or other equivalent indicator means.

Figure 2:
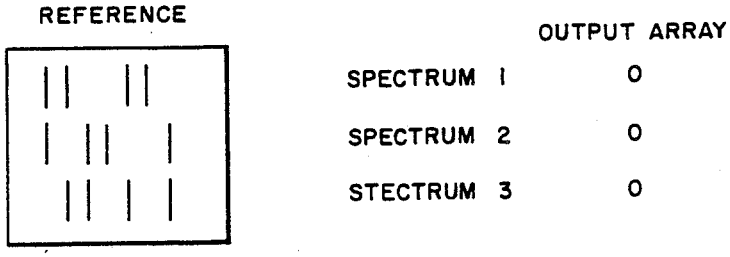
FIG. 2 is a view depicting different reference spectra that can be used to produce a plurality of outputs with each of the outputs being identifiable.

Referring now to FIG. 2, if more than one species or different specimens are desired to be detected by the matched filter in the same operation, a spectrometer 10 can be utilized that can detect a plurality of different species on spectrums such as those illustrated as 1, 2, and 3 of FIG. 2. The 3 spectrums are transmitted to image forming modulator 16 of correlator 18 and if any one or all of the species are present, with matched filter 20 having the appropriate reference patterns thereon, one or more outputs will appear and be projected onto a detector which is a linear detector with different detectors spaced apart so that for example spectrum 1 would fall on a first particular detector of detector 22, spectrum 2 would fall on a second particular detector of detector 22, and spectrum 3 would fall on yet a third particular detector of detector 22. Each of these three particular detectors are then utilized to initiate appropriate indicator means for indicating which one or ones of the three spectrums are present. It will be appreciated by those skilled in this art that an advantage of utilizing an optical correlator with the matched filter approach is shift. The optical correlator can recognize a spectral pattern even if the pattern is shifted. This means that applicant's method tolerates poor calibration from the spectrometer.

It is also pointed out that the optical correlator has the ability to recognize many patterns even if they are not the one normally displayed to a human operator. Thus, if the spectrometer is a Fourier Transform spectrometer, this device can recognize the species without a computer forming the terminal transform. In this and other cases, background subtraction is desirable, and the optical correlator used here offers a convenient approach. If the image forming modulator such as 16 is used for working by rotating polarization (most of the image forming modulators work this way), the polarizer in the following optical system can be rotated such that the sample-less signal balances to zero. Therefore, it will be appreciated that by utilizing these devices in the method set forth by applicant causes advancement of the identification process.

I claim:

1. A method of determining predetermined chemical agents comprising, providing a spectrometer with a chemical sample therein to be tested for the presence of predetermined chemical species, producing an output from the spectrometer that depicts spectra of the chemical species present in the sample, transmitting the output of the spectrometer to an image forming modulator of a correlator that has a predetermined matched filter with a pattern thereon for detecting the desired chemical species, processing the input provided to said image forming modulator to produce an output at detector means of the correlator when the predetermined chemical species are present, producing signal means from said detector means and controlling indicator means that indicate the chemical species detected.

2. A method as set forth in claim 1, wherein said spectrometer produces a plurality of spectra of different chemical species, said matched filter of said correlator includes matched patterns that identify the desired species, detecting with said detector means each of the identified chemical species, and identifying with said indicator means each of the chemical species detected.

* * * * *